United States Patent
Sylvia et al.

(10) Patent No.: US 9,853,360 B2
(45) Date of Patent: Dec. 26, 2017

(54) INFLATABLE RADAR SIGNAL DEVICE

(71) Applicant: LOCKHEED MARTIN CORPORATION, Bethesda, MD (US)

(72) Inventors: Russell M. Sylvia, South Dartmouth, MA (US); Robert P. Gordon, Jr., North Attleboro, MA (US); Martin C. Lewis, Plymouth, MA (US); Mark E. Whalen, Rochester, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 158 days.

(21) Appl. No.: 14/744,829

(22) Filed: Jun. 19, 2015

(65) Prior Publication Data
US 2015/0372391 A1 Dec. 24, 2015

Related U.S. Application Data

(60) Provisional application No. 62/014,935, filed on Jun. 20, 2014.

(51) Int. Cl.
*G08B 5/00* (2006.01)
*B63C 9/18* (2006.01)
(Continued)

(52) U.S. Cl.
CPC .............. *H01Q 15/14* (2013.01); *B63B 22/22* (2013.01); *B63C 11/26* (2013.01); *G01S 19/14* (2013.01);
(Continued)

(58) Field of Classification Search
CPC .. B63C 9/00; B63C 9/081; B63C 9/15; B63C 9/155; B63C 9/18; B63C 9/20;
(Continued)

(56) References Cited

U.S. PATENT DOCUMENTS 2,534,716 A * 12/1950 Hudspeth ............... H01Q 15/20
   342/8
2,629,115 A *  2/1953 Hansen ..................... B63C 9/20
   116/107

(Continued)

FOREIGN PATENT DOCUMENTS

KR    10-2010-0118622    11/2010

OTHER PUBLICATIONS

Search report for international application No. PCT/US2015/036735, dated Sep. 23, 2015 (3 pages).

(Continued)

*Primary Examiner* — Peter M Bythrow
(74) *Attorney, Agent, or Firm* — Hamre, Schumann, Mueller & Larson, P.C.

(57) ABSTRACT

An inflatable RADAR signal device that is capable of rising above the surface of the water when deployed and that reflects RADAR emissions. The signal device is a self-contained, small, independent system that can withstand being present in a maritime environment, including being submerged in the water and/or being located on a vessel in the water, for an extended amount of time. The device includes a housing that houses one or more deflated balloons that are constructed of a material that, when inflated, rise above the level of the water and that reflect RADAR emissions. The device includes at least one gas cylinder for inflating the balloon(s), and a mechanism to trigger release of the balloon(s) from the housing including a mechanism to trigger release of the gas from the gas cylinder(s) to inflate the balloon(s).

15 Claims, 11 Drawing Sheets

(51) Int. Cl.
*H01Q 15/14* (2006.01)
*G01S 19/14* (2010.01)
*B63C 11/26* (2006.01)
*B63B 22/22* (2006.01)
*B63C 9/15* (2006.01)
*B64B 1/50* (2006.01)

(52) U.S. Cl.
CPC .............. *G08B 5/002* (2013.01); *B63C 9/155* (2013.01); *B64B 1/50* (2013.01)

(58) Field of Classification Search
CPC .... B63C 2009/0017; B63C 2009/0023; B63C 2009/007; B64B 1/40; B64B 1/50; B64B 1/54; G08B 5/002; H01Q 17/00–17/008
USPC .............................................. 342/5, 8, 9, 10
See application file for complete search history.

(56) References Cited

U.S. PATENT DOCUMENTS

| | | | | |
|---|---|---|---|---|
| 2,646,019 A * | 7/1953 | Chetlan | B64B 1/40 | 116/210 |
| 2,888,675 A * | 5/1959 | Pratt | H01Q 15/20 | 244/31 |
| 3,181,158 A * | 4/1965 | Feldman | H01Q 1/082 | 342/10 |
| 3,310,024 A * | 3/1967 | McConnell | G08B 5/002 | 116/210 |
| 3,381,655 A * | 5/1968 | Rozzelle | B64B 1/62 | 116/210 |
| 3,604,001 A * | 9/1971 | Deal | G08B 5/002 | 250/338.1 |
| 3,624,653 A * | 11/1971 | Kelly | H01Q 1/082 | 342/10 |
| 3,657,752 A * | 4/1972 | Davidson | B63B 22/22 | 116/210 |
| 3,721,983 A * | 3/1973 | Sherer | H01Q 1/082 | 116/210 |
| 3,727,229 A * | 4/1973 | Clinger | H01Q 1/28 | 116/210 |
| 3,735,723 A * | 5/1973 | Lutz | G08B 5/002 | 116/210 |
| 3,941,079 A * | 3/1976 | McNeill | B64B 1/50 | 116/210 |
| 4,120,259 A * | 10/1978 | Wilson | F41J 2/00 | 116/210 |
| 4,123,987 A * | 11/1978 | Singerle | B64B 1/50 | 116/277 |
| 4,416,433 A * | 11/1983 | Bellina | F21V 3/023 | 116/210 |
| 4,560,356 A * | 12/1985 | Burr | B63C 9/08 | 222/5 |
| 4,586,456 A * | 5/1986 | Forward | B63C 9/20 | 116/210 |
| 4,673,934 A * | 6/1987 | Gentry | H01Q 15/20 | 342/8 |
| 4,695,841 A * | 9/1987 | Billard | H01Q 15/18 | 342/8 |
| 4,696,252 A * | 9/1987 | Grill | B64B 1/40 | 116/210 |
| 4,768,739 A * | 9/1988 | Schnee | B64D 17/025 | 116/210 |
| 4,815,677 A * | 3/1989 | Rushing | G08B 5/002 | 116/210 |
| 4,944,242 A * | 7/1990 | Russell | B64B 1/50 | 116/210 |
| 4,980,688 A * | 12/1990 | Dozier, Jr. | H01Q 15/20 | 342/15 |
| 5,065,163 A * | 11/1991 | Mears | H01Q 1/1292 | 343/706 |
| 5,095,845 A * | 3/1992 | Murphy | B64B 1/50 | 116/210 |
| 5,199,374 A * | 4/1993 | Blanchette | B63B 22/12 | 116/209 |
| 5,262,768 A * | 11/1993 | Florer | G08B 5/002 | 340/473 |
| 5,301,631 A * | 4/1994 | Vining | B64B 1/50 | 116/210 |
| 5,429,244 A * | 7/1995 | McCreary | B64B 1/50 | 116/210 |
| 5,457,472 A * | 10/1995 | Bjordal | H01Q 15/20 | 342/8 |
| 5,555,839 A * | 9/1996 | Staten | B63C 9/00 | 116/209 |
| 5,582,127 A * | 12/1996 | Willis | B64B 1/40 | 116/210 |
| 5,732,752 A * | 3/1998 | Glessner | B63C 9/24 | 116/210 |
| 5,820,243 A * | 10/1998 | Chang | F21V 3/023 | 362/234 |
| 5,838,275 A * | 11/1998 | Carmi | H01Q 15/20 | 342/10 |
| 5,969,660 A * | 10/1999 | Veazey | B63B 49/00 | 342/10 |
| 6,109,203 A * | 8/2000 | Mears | B63C 9/0005 | 116/210 |
| 6,195,039 B1 * | 2/2001 | Glass, Jr. | B63C 9/0005 | 342/357.75 |
| 6,244,209 B1 * | 6/2001 | Aguiar | G09F 21/06 | 116/210 |
| 6,254,445 B1 * | 7/2001 | Jones | B63C 11/26 | 441/1 |
| 6,300,893 B1 * | 10/2001 | Schaff | H01Q 1/081 | 342/10 |
| 6,359,568 B1 * | 3/2002 | Johnson | B63C 9/21 | 116/210 |
| 6,368,174 B1 * | 4/2002 | Magee | B63C 9/20 | 441/106 |
| 6,384,764 B1 * | 5/2002 | Cumberland | H01Q 1/081 | 342/10 |
| 6,477,979 B1 * | 11/2002 | Sanchez | B64B 1/50 | 116/210 |
| 6,805,071 B2 * | 10/2004 | Jakubowski, Jr. | G08B 5/002 | 116/210 |
| 7,886,682 B1 * | 2/2011 | Germain | B64B 1/50 | 116/210 |
| 7,932,850 B1 * | 4/2011 | Hochschild, III | H01Q 1/34 | 342/10 |
| 9,449,475 B2 * | 9/2016 | Aguilar | G08B 5/002 | |
| 2004/0142613 A1 * | 7/2004 | Barden | B63C 9/155 | 441/6 |
| 2004/0163582 A1 * | 8/2004 | Willis | G08B 5/002 | 116/210 |
| 2006/0231012 A1 * | 10/2006 | Wamester | A62B 33/00 | 116/210 |
| 2007/0284476 A1 * | 12/2007 | Sjoblom | B63C 9/20 | 244/33 |
| 2014/0118178 A1 * | 5/2014 | Yahagi | H01Q 15/18 | 342/8 |
| 2014/0125507 A1 * | 5/2014 | Yahagi | H01Q 15/20 | 342/8 |
| 2015/0191231 A1 * | 7/2015 | Kang | H01Q 15/163 | 342/10 |

OTHER PUBLICATIONS

Written opinion for international application No. PCT/US2015/036735, dated Sep. 23, 2015 (6 pages).

* cited by examiner

INFLATABLE RADAR SIGNAL DEVICE

FIELD

This disclosure relates to a signal device used in maritime environments.

BACKGROUND

Divers and low lying vessels such as certain motorized craft, sailboats, kayaks, or underwater vehicles on the surface are nearly invisible on the water due to their size and they have little or no expression on other vessels' radio detection and ranging (RADAR) screens. There is a clear danger of being run down by ships or being lost at sea in the event of trouble.

Passive signal devices such as RADAR reflectors are known that are currently mounted high on the masts of motorized crafts, sailboats and working boats to increase their potential appearance on the radar screen of other vessels. These devices become critical equipment at night or in fog and to avoid collision and facilitate search and rescue operations in the event of trouble. Divers and low lying vessels such as kayaks and underwater vehicles are nearly invisible in these conditions and the potential of being accidently run down become a quick reality.

Currently divers use a dive flag to mark their location where they are diving but have no RADAR reflecting device. Some kayakers mount a RADAR reflector to the deck of their kayak but it has little effect at the low elevation above the water. In addition, some underwater vehicles have employed an end-of-mission inflatable RADAR reflecting bag that is designed to float at the surface of the water. However, the reflecting bag is filled with $CO_2$ and since it floats at the water surface, its elevation is often lower than a kayak's deck.

SUMMARY

An inflatable RADAR signal device is described that is capable of rising above the surface of the water when deployed and that reflects RADAR emissions. The signal device is a self-contained, small, independent system that can withstand being present in a maritime environment, including being submerged in the water and/or being located on a vessel in the water, for an extended amount of time. The device includes a housing that houses one or more deflated balloons that are constructed of a material that, when inflated, rise above the level of the water and that reflect RADAR emissions. The device includes at least one gas cylinder for inflating the balloon(s), and a mechanism to trigger release of the balloon(s) from the housing including a mechanism to trigger release of the gas from the gas cylinder(s) to inflate the balloon(s).

In one embodiment, the signal device can be used as a warning device so that an individual or vessel that uses the device has increased expression on other vessels' RADAR screens to warn the other vessels of the presence of the individual and/or vessel.

In another embodiment, the signal device can be used as a rescue aid by making an individual or vessel that uses the device more easily discoverable in the water as a result of increased expression on other vessels' RADAR screens.

In another embodiment, the signal device can be used as a decoy device that is intended to reflect RADAR emissions in a manner that is intended to present a misrepresentation on other vessels' RADAR screens.

Some or all of the balloon(s) can be made of any material that reflects RADAR emissions. One example of a suitable material is a metalized plastic film such as biaxially-oriented polyethylene terephthalate. MYLAR™ is one example of a biaxially-oriented polyethylene terephthalate that could be used. However, any material that reflects RADAR emissions can be used.

In addition, the entire balloon need not be made of RADAR-reflecting material. Instead, the balloon(s) can include suitable RADAR-reflecting material disposed on a portion of its surface or even disposed within the balloon. So the balloon(s) can be made of rubber or latex, yet include RADAR-reflecting material on an exterior surface of the balloon, on an interior surface of the balloon(s), or be otherwise disposed within the interior of the balloon(s).

In one embodiment, a RADAR signal device includes a housing defining a liquid tight interior space, at least one gas cylinder disposed within the interior space that is charged with a suitable lifting or lighter than air gas such as helium or hydrogen, and at least one inflatable balloon mounted on, for example within, the housing. The balloon is fluidly connectable to the gas cylinder to permit inflation of the balloon by the lifting gas, the balloon is tethered to the housing, and the balloon includes RADAR-reflecting material. The device also includes means for controlling the release of the lifting gas from the gas cylinder into the balloon in order to inflate the balloon, means for releasing the balloon from the housing so that when the balloon is inflated, the balloon floats upwardly above the housing while remaining tethered to the housing.

In one embodiment, the housing is buoyant so that it can float at the surface of the water, and the housing can be actuated from a closed storage configuration to an open release configuration permitting release of the inflated balloon(s) from within the housing. The housing is sealed to prevent ingress of water into the housing and permitting the housing to be deployed at depth within water.

In another embodiment, the device includes at least two inflatable balloons that are disposed within the housing.

In one embodiment, the balloons are tethered to the housing in a manner so that when the balloons are inflated one of the balloons floats at a first height above the housing while a second balloon floats at a second height greater than the first height, as well as being horizontally spaced from one another. The different float heights and horizontal spacing help to enhance the RADAR reflection so that the resulting expression on other vessels' RADAR screens appears more prominent, unique, and different than the expression that may result from objects not of interest or clutter, such as debris that is floating in the water.

In another embodiment, each balloon is made of a metallized plastic film that is RADAR-reflecting, such as Mylar™.

The means for controlling the release of the lifting gas from the gas cylinder can be an actuatable gas release mechanism that can be actuated, manually and/or automatically, to release the lifting gas from the gas cylinder into the balloon(s) in order to inflate the balloon(s).

The means for releasing the balloon from the housing can be an actuatable balloon release mechanism that can actuate, manually and/or automatically, the housing from the closed storage configuration to the open release configuration to permit release of the balloons from the housing so that when the balloons are inflated, the balloons float upwardly above the housing while remaining tethered to the housing.

In one embodiment, the device is passive in which case the device relies solely on the RADAR reflection capability of the balloon(s) to aid in locating the device.

In another embodiment, the device is active in which case, in addition to the RADAR reflection capability of the balloon(s), the device also includes active signaling capability. The active signaling capability can include, but is not limited to, one or more of the following: communicating its location via a GPS or satellite antenna; emitting flashes of light; emitting sounds waves or pings into the water; and other active signaling techniques that may aid in signaling the presence of the device. Electrical power for the active signaling can be provided by at least one battery disposed in the housing.

In another embodiment, a method comprises providing a signal device as described herein.

DRAWINGS

DETAILED DESCRIPTION

Figure 1:
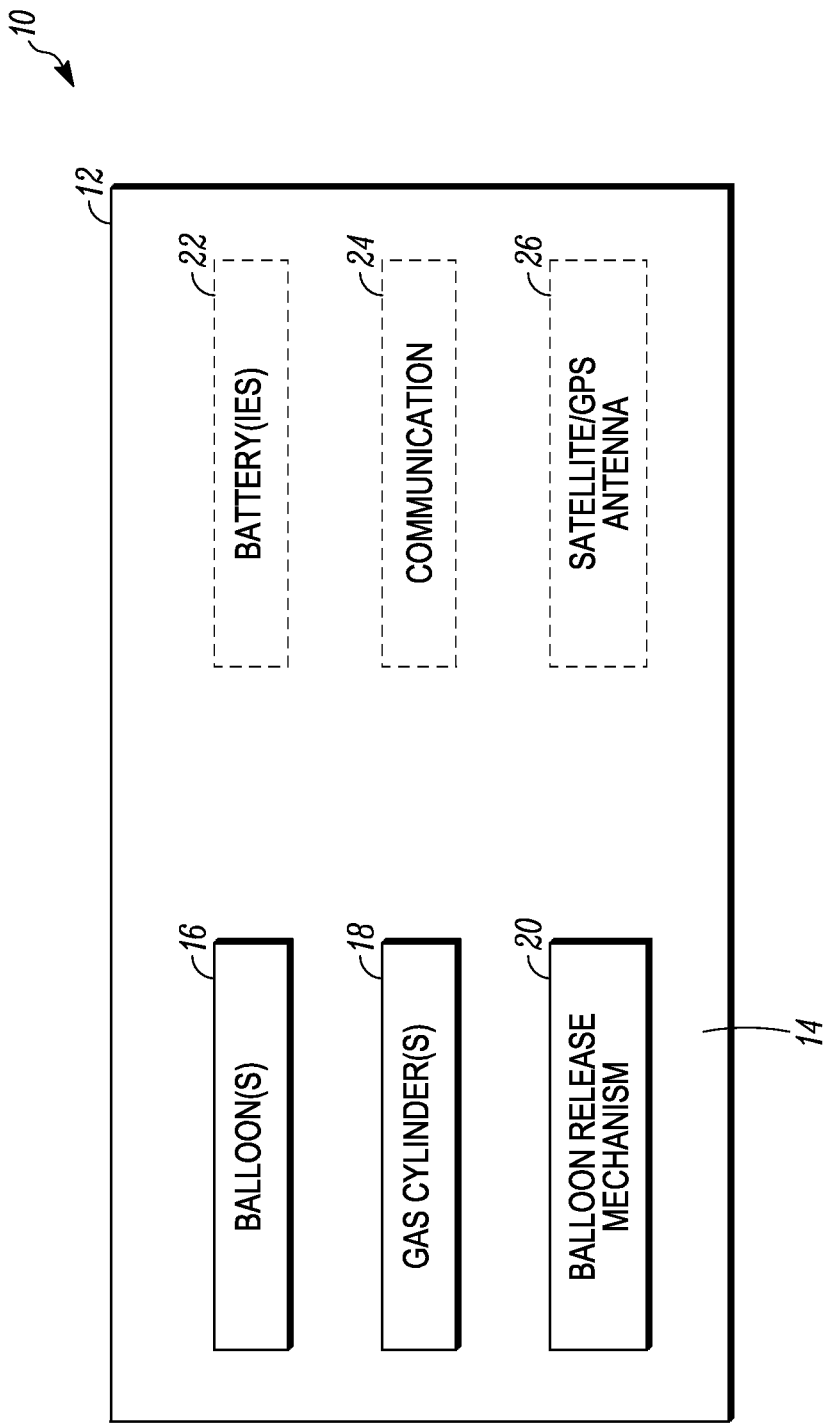
FIG. 1 is a schematic depiction of a signaling device described herein.

An inflatable RADAR signal device is described that is capable of rising above the surface of the water when deployed and that reflects RADAR emissions. The signal device is a self-contained, small, independent system that can withstand being present in a maritime environment, including being submerged in the water and/or being located on a vessel in the water, for an extended amount of time. In general, the device includes a housing that houses one or more deflated balloons that are constructed of a material that, when inflated and released from the housing, rise above the level of the water and that reflect RADAR emissions while remaining tethered to the housing. The device also includes at least one gas cylinder for inflating the balloon(s), and a mechanism to trigger release of the balloon(s) from the housing including a mechanism to trigger release of the gas from the gas cylinder(s) to inflate the balloon(s).

In one embodiment, the device is relatively small, lightweight and manually portable permitting the device to be manually transported. In another embodiment, the device may be larger and heavier and may not be manually portable, but instead may require a deployment or delivery platform or vehicle to deploy the device into the water.

The device can be made buoyant so that when the device is in water, either intentionally or unintentionally, the device floats at the surface, preferably with at least an upper portion of the device disposed above the surface of the water. However, in other embodiments, for example where the device is intended to be disposed on a floating platform, the device may not be buoyant such that if the device falls into the water, it would sink to the bottom.

In one embodiment, prior to balloon deployment the device is watertight to prevent ingress of water into the device. This protects the components of the device from corrosion and other damage from the water, permitting the device to withstand being present in a maritime environment for an extended amount of time.

The device can be used in any water environment such as salt water, fresh water, and brackish water. The device can be used in any body of water including seas, oceans, lakes, and the like.

In one embodiment, the device is configured to be deployable by a diver as the diver is diving in a body of water to alert other vessels of the location and/or presence of the diver. In this embodiment, the device can be deployed within the water, or deployed on a vessel supporting the diver.

In another embodiment, the device is configured to be deployable on a vessel including, but not limited to, a motorized craft, a sailboat, a row boat, a kayak, a life raft, an underwater vehicle that is at or near the surface of the water, and the like, to alert other vessels of the location and/or presence of the vessel.

In another embodiment, the device is configured to be launched into the water from a delivery platform or vehicle including, but not limited to, an aircraft, a surface vessel, an underwater vehicle such as a submarine, an Autonomous Underwater Vehicle (UAV), Remotely Operated Vehicle (ROV), or other platforms that are configured for delivering and launching payloads. The device in this embodiment may be used as a decoy device that is intended to reflect RADAR emissions in a manner that is intended to present a misrepresentation on other vessels' RADAR screens.

In one embodiment, the device is passive in which case the device relies solely on the RADAR reflection capability of the balloon(s) to aid in locating the device. In this embodiment, passive means that any signaling of the device comes solely from the inflated balloon(s) even though the device may have electronics powered by one or more batteries that are used in the functioning of the device such as inflating the balloon(s) and/or releasing the balloon(s).

In another embodiment, the device is active in which case, in addition to the RADAR reflection capability of the balloon(s), the device also includes some form of active signaling capability where the device sends out a signal that is detectable by another vessel. The active signaling capability of the device can include, but is not limited to, one or more of the following: communicating the location of the device via a GPS or satellite antenna; emitting flashes of light; emitting sounds waves or pings into the water; and other active signaling techniques that are detectable to aid in signaling the presence of the device.

Once inflated, the balloon(s) is intended to remain floating above the water for a significant length of time. The length of time can be measured in hours, days or even weeks. The length of float time can be based on factors such as the material of the balloon(s) and how quickly the floating gas escapes from the balloon(s).

Some or all of the balloon(s) can be made of any material that reflects RADAR emissions. One example of a suitable material is a metalized plastic film such as biaxially-oriented polyethylene terephthalate. MYLAR™ is one example of a biaxially-oriented polyethylene terephthalate that could be used. MYLAR™ is a commonly used material to form balloons. However, any material that reflects RADAR emissions can be used.

In addition, the entire balloon need not be made of RADAR-reflecting material. Instead, the balloon(s) can include suitable RADAR-reflecting material disposed on a portion of its surface or even disposed within the balloon. So the balloon(s) can be made of rubber or latex, yet include RADAR-reflecting material on an exterior surface of the balloon, on an interior surface of the balloon(s), or be otherwise disposed within the interior of the balloon(s).

In one embodiment, the outer surface of the balloon(s) is coated with a hydrophobic material so that water from rainfall sheds from the balloon(s) and helps prevent the rainfall from knocking the balloon(s) down during a rainstorm.

In one embodiment, the device can be disposable in that it is not intended to be reused after it has been activated. As used herein, activated means that the balloon(s) of the device has been inflated and released to float above the surface of the water to provide RADAR reflection. In another embodiment, some components of or the entire device can be reusable after the device has been activated.

Figure 2B:
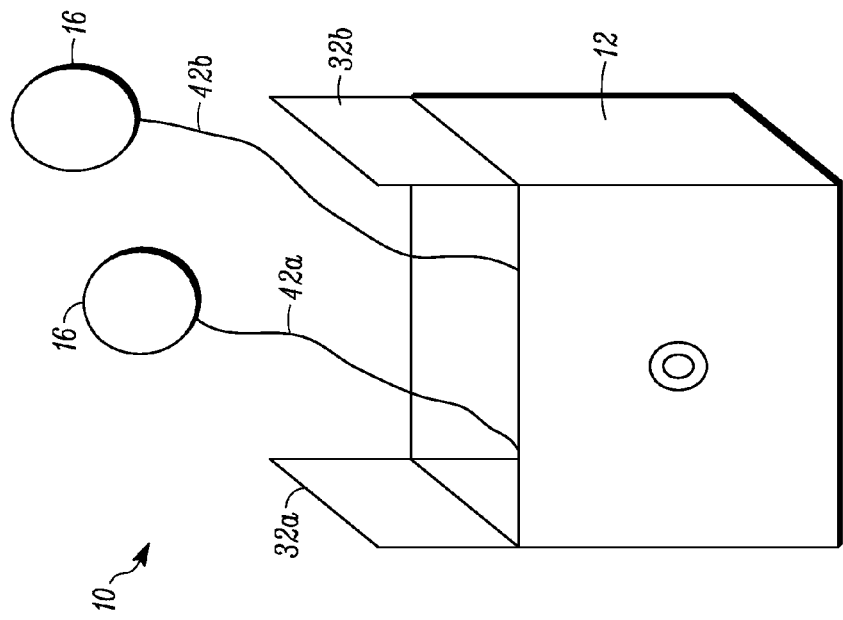
FIG. 2B is a perspective view of the signaling device of FIG. 2A in an open release configuration with the balloons inflated and floating above the housing and the surface of the water.
Figure 2A:
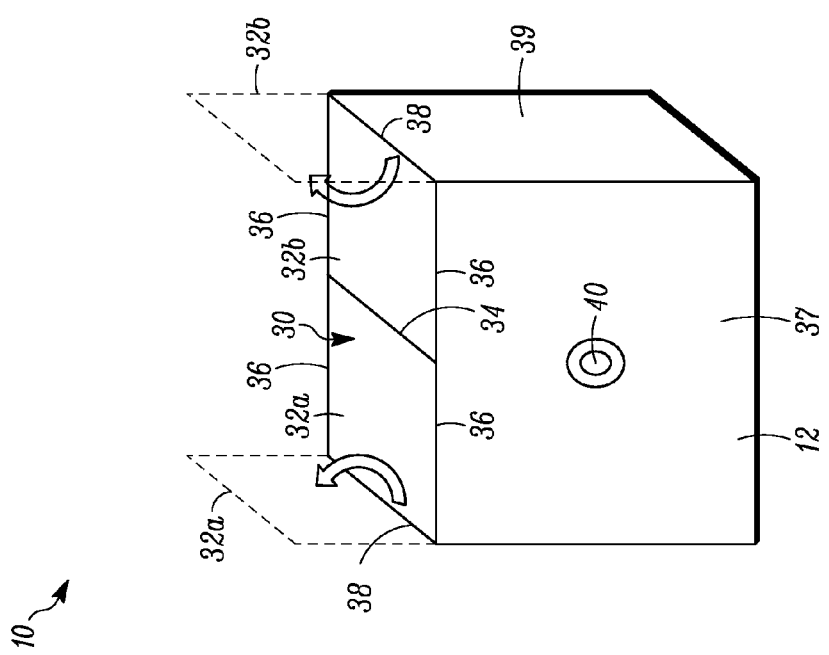
FIG. 2A is a perspective view of one example of a housing of the signaling device in a closed storage configuration.

Turning now to FIG. 1, a schematic depiction of a signaling device 10 is provided. The signaling device 10 includes a housing 12 that defines an interior space 14. As illustrated in FIGS. 2A and 2B, the housing 12 has a closed storage configuration (FIG. 2A) and an open release configuration (FIG. 2B), and the housing 12 can be actuated from the closed storage configuration to the open release configuration.

At the closed storage configuration, the interior space 14 of the housing 12 is liquid tight to prevent ingress of water into the interior space 14. At the open release configuration of the housing, some water may enter some of the interior space 14 or water may contact some components within the interior space 14. However, the housing 12 remains primarily water tight and in one embodiment the housing remains buoyant so that the housing 12 can float in water if the device 10 is disposed in the water when the open release configuration.

As depicted in FIG. 1, the housing 12 includes one or more balloons 16, one or more gas cylinders 18 for inflating the balloon(s) 16, and a balloon release mechanism 20 that permits release of the balloon(s) from the housing 12. Optional components (illustrated in dashed lines) include one or more batteries 22, communication equipment 24 such as a transceiver, and a satellite or GPS antenna 26.

In the illustrated example, the balloon(s) 16 is initially disposed within the interior space 14 when the housing is at the closed storage configuration. However, the balloon(s) 16 can be disposed outside the interior space of the housing 12, for example in a package that is secured to the outside of the housing 12, where the package is manually opened by the user or automatically opened to permit release of the balloon(s) 16.

In embodiments discussed below, there are two of the balloons 16. The two balloons are tethered to the housing 12 so that the balloons float at different heights above the water and above the housing. The use of two balloons helps to provide a distinctive RADAR reflection so that the resulting expression on other vessels' RADAR screens appears more prominent, unique, and different than the expression that may result from objects not of interest, such as debris that is floating in the water. However, a larger or smaller number of balloons could be used. For example, a single balloon that has a unique shape or that has a shape that mimics the two balloons could be used.

The gas cylinder(s) 18 are pre-charged (or are chargeable by the user) with a pressurized, lighter than air gas, which can also be referred to as a lifting gas. The gas from the cylinder(s) 18 is used to inflate the balloon(s) 16. The pressurized gas in the cylinder(s) 18 can be any lifting gas that is suitable for inflating the balloon(s) and cause the balloon(s) to float above the surface of the water. Examples of suitable lifting gas includes, but are not limited, helium and hydrogen. One of the gas cylinders 18 can be provided for each balloon 16. Alternatively, a single gas cylinder 18 can be used to inflate each balloon 16.

The balloon release mechanism 20 causes release of the balloon(s) 16 from the housing 12. As used herein, release of the balloon(s) 16 from the housing 12 means that the balloon(s) is allowed to float upward above the housing and the water once the balloon(s) 16 is inflated. However, the balloon(s) 16 remains tethered to the housing 12 in any suitable manner, some examples of which are discussed further below. In one embodiment, the release mechanism 20 can include a mechanism for opening the housing 12 to the open release configuration. In another embodiment, the release mechanism 20 can include a mechanism for opening the housing 12 to the open release configuration as well as a mechanism to release the balloon(s) from its fluid connection to the gas cylinder(s) 18.

The battery(ies) 22, if provided, can provide electrical energy for powering certain functions of the device 10 that may require electrical energy. For example, the battery(ies) 22 can power the communication equipment 24 and the satellite or GPS antenna 26. The battery(ies) 22 can also provide power for an actuatable gas release mechanism that can be actuated to release the lifting gas from the gas cylinder(s) 18 into the balloon(s) 16 in order to inflate the balloon(s), an example of which is discussed further below. The battery(ies) 22 can also provide power for an actuatable balloon release mechanism, an example of which is discussed further below.

The communication equipment 24, if provided, can send communications from and receive communications sent to the device 10. Communications sent from the device 10 can include, but are not limited to, position information of the device 10, information relating to the condition or health of the device 10, battery life information, information identifying the device 10 or the person or vessel using the device 10, and other communications. Communications sent to the device 10 can include, but are not limited to, a trigger signal that causes the device 10 to automatically activate, a signal requesting a status update from the device 10, and other communications.

The satellite or GPS antenna 26, if used, permits the device 10 to communicate its position information via satellites.

With reference to FIGS. 2A and 2B, an example of opening the housing 12 to the open release configuration is illustrated. In this example, the housing 12 includes a top 30 that is formed by a pair of flaps 32a, 32b. In FIG. 2A, the flaps 32a, 32b are shown as being closed, with facing edges of the flaps 32a, 32b forming a frangible joint 34. Side edges 36 of the flaps 32a, 32b where they meet side walls 37 (only one side wall 37 is visible in FIG. 2A) of the housing can also form frangible joints with the side walls 37. End edges 38 of the flaps 32a, 32b can be permanently secured to end walls 39 (only one end wall 39 is visible in FIG. 2A) of the housing 12 or they can be secured to the end walls 39 using frangible joints.

In the closed storage configuration, the flaps 32a, 32b are sealed along their edges to each other at the frangible joint 34 and to the side walls 37 and the end walls 39 of the housing 12. To achieve the open release configuration, the frangible joints of the flaps 32a, 32b can be broken in any suitable manner permitting the flaps 32a, 32b to pivot upward to the positions shown in dashed lines in FIG. 2A. The frangible joints can be manually broken by the user when the user wishes to activate the device 10. The frangible joints can be broken by a mechanical spring arrangement similar to the nose cone release mechanism discussed below with respect to FIG. 6 that is internal to the device 10 and pushes upwardly on the flaps 32a, 32b to break the frangible joints. The frangible joints can also be broken using burn wires. Other options for breaking the frangible joints are possible.

As indicated above, activation of the device 10 can occur automatically upon receipt of a suitable trigger signal. The device 10 may also be activated manually. FIG. 2A shows a button 40 on the housing 12 that a user can push to activate the device 10. When the button 40 is pushed, the device 10 breaks the frangible joints permitting the housing 12 to open to the open release configuration (or the user also manually breaks the frangible joints) and/or inflation of the balloon(s) 16 is triggered.

FIG. 2B shows the housing 12 at the open release configuration with the flaps 32a, 32b opened upwardly. The balloons 16 are shown inflated by the gas cylinder(s) 18 and floating above the device 10. Tethers 42a, 42b connect the balloons 16 to the housing 12 preventing the balloons 16 from floating away. In the illustrated example, the tether 42a is shorter in length than the tether 42b so that the balloon 16 that is connected to the tether 42a floats at a lower height than the balloon that is connected to the tether 42b.

Figure 3:
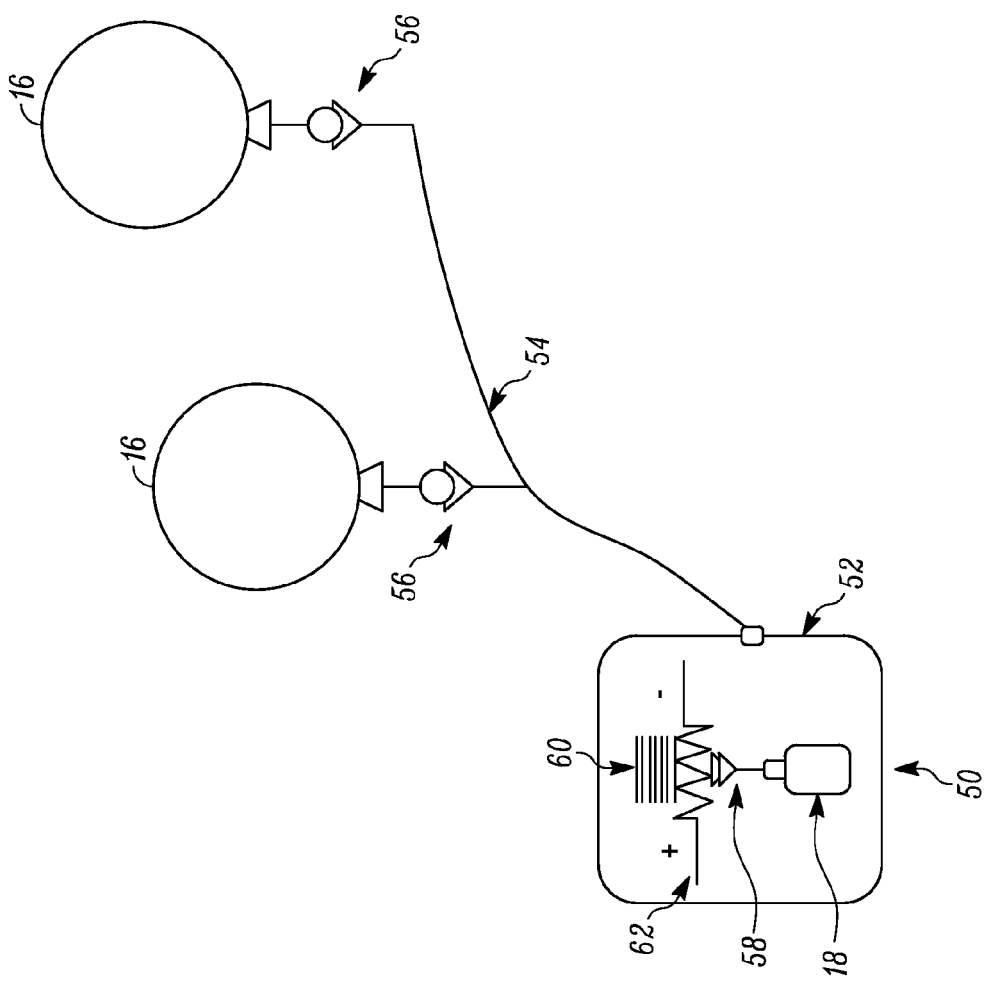
FIG. 3 is a schematic depiction of an actuatable gas release mechanism for releasing gas from a gas cylinder into the balloons.

FIG. 3 depicts an example of an actuatable gas release mechanism 50 for releasing gas from the gas cylinder(s) 18 into the balloons 16. The gas release mechanism 50 can be disposed within the housing 12 described in this application to cause inflation of the balloons 16. In this example, the gas release mechanism 50 is automatically actuatable when the device 10 is activated.

In this example, the gas cylinder 18 is enclosed within a sealed container 52. Tubing 54 fluidly connects the interior of the container 52 with each balloon 16 to direct lifting gas from the container 52 into the balloons 16. The tubing 54 also acts as tethers in this example to tether the balloons to the device. One way check valves 56 are provided between the balloons 16 and the tubing 54 to permit lifting gas to flow into but not out of the balloons 16.

The lifting gas is released from the gas cylinder 18 into the container 52 using stored mechanical energy. In particular, a movable dart 58 is disposed adjacent to the gas cylinder 18 in a position to be able to penetrate the gas cylinder 18 to release the lifting gas from the cylinder when the dart is pushed into engagement with the cylinder 18. A compressed spring 60 is disposed adjacent to an end of the dart 58, with the spring being held in its compressed state by a burn wire 62 that is electrically connected to the battery 22. When the device 10 is activated, electrical energy is directed through the burn wire 62 causing the burn wire to break, thereby releasing the potential energy in the spring 60. The spring 60 projects the dart 58 into the gas cylinder 18 releasing the gas into the container 52 to inflate the balloons 16 through the tubing 54. The dart 58, the spring 60 and the burn wire 62 effectively form a valve controlling release of gas from the cylinder 18.

Although the gas release mechanism 50 has been described as being automatically actuatable, the gas release mechanism 50 can also be manually actuatable by the user. For example, the user could break open the gas cylinder or the user could simply open a manual valve to release the lifting gas to inflate the balloons. In another embodiment, an electronic solenoid valve can be used to release the gas from the cylinder.

To prevent over-inflation of the balloons, a regulator can be provided in the system to limit the inflation of the balloons 16.

FIGS. 4-11 illustrate an embodiment of a signal device 100 that is intended to be deployed in the water and to be activated while the device 100 is in the water. In this embodiment, the device 100 is buoyant so that it floats in the water 102, with an upper portion of the device 100, including a nose cone 104 thereof, disposed above the surface 106 of the water 102. The device 100 is intended to float in a generally vertical orientation illustrated in FIG. 4. An end 108 of the device 100 opposite the nose cone 104 can be provided with fins 110 to improve the hydrodynamic properties of the device 100. However, the device 100 does not include an integrated or self-contained propulsion system that propels the device through the water. Instead, the device 100 is intended to be deployed into the water from a delivery platform such as a submarine, UAV, ROV, aircraft, or the like.

Figure 4:
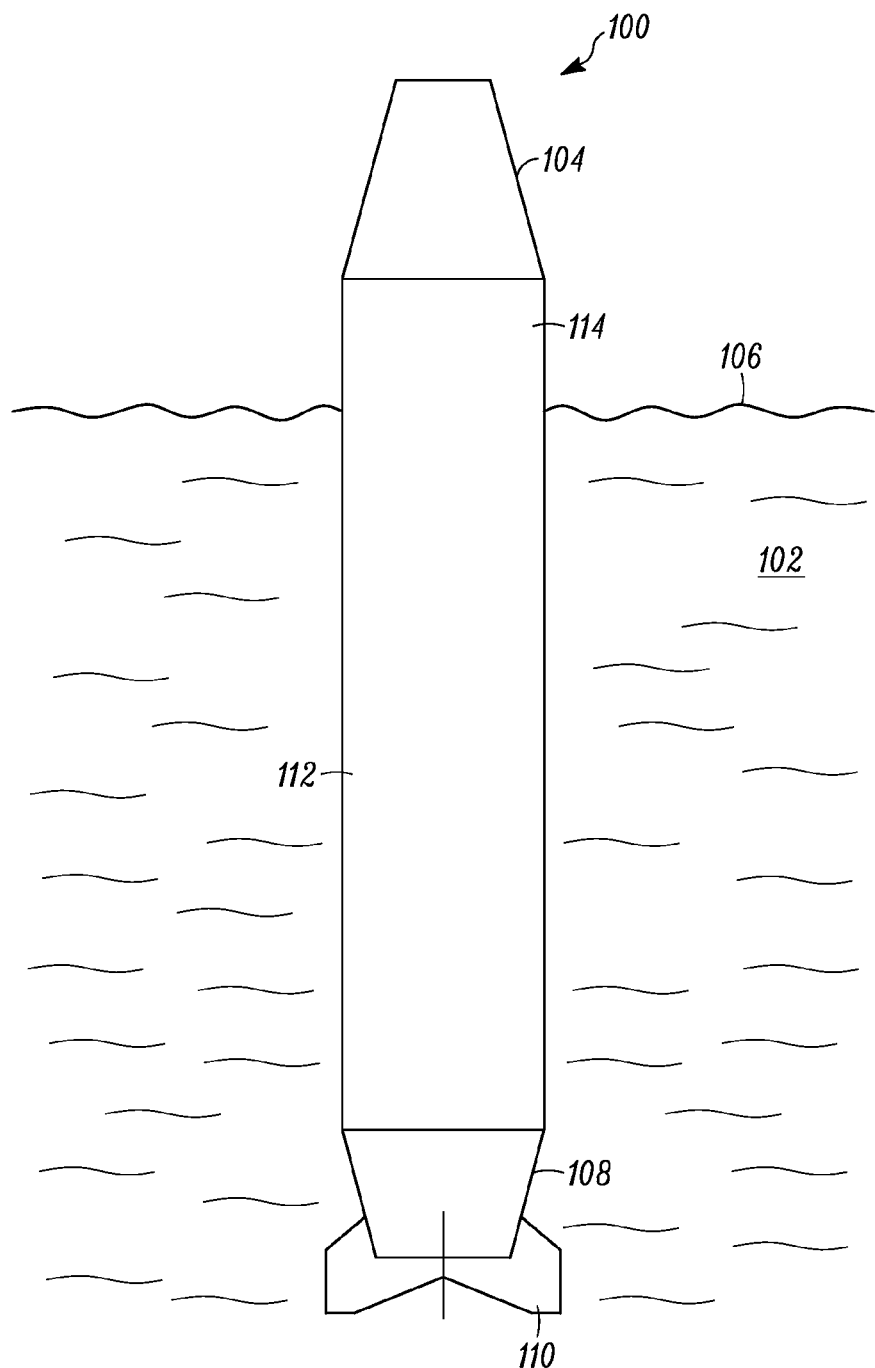
FIG. 4 is a side view of another embodiment of a housing of the signaling device.

The device 100 includes a cylindrical main body 112, with the cylindrical nose cone 104 detachably connected to an upper end 114 of the body 112. The body 112 and the nose cone 104 form a housing defining a liquid tight interior space. FIG. 4 shows the housing in the closed storage configuration with the nose cone 104 attached to the body 112. The nose cone 104 can be released from the body 112 to create the open release configuration of the housing.

In the device 100, the gas cylinder(s) and balloon(s) are disposed in the body 112 near or adjacent to the nose cone 104 such that when the nose cone 104 is released from the body 112, the balloon(s) can be released to float upward above the surface 106 of the water. Prior to release of the nose cone 104, the nose cone 104 protects the gas cylinder(s), balloon(s) and other components from the water.

Figure 5:
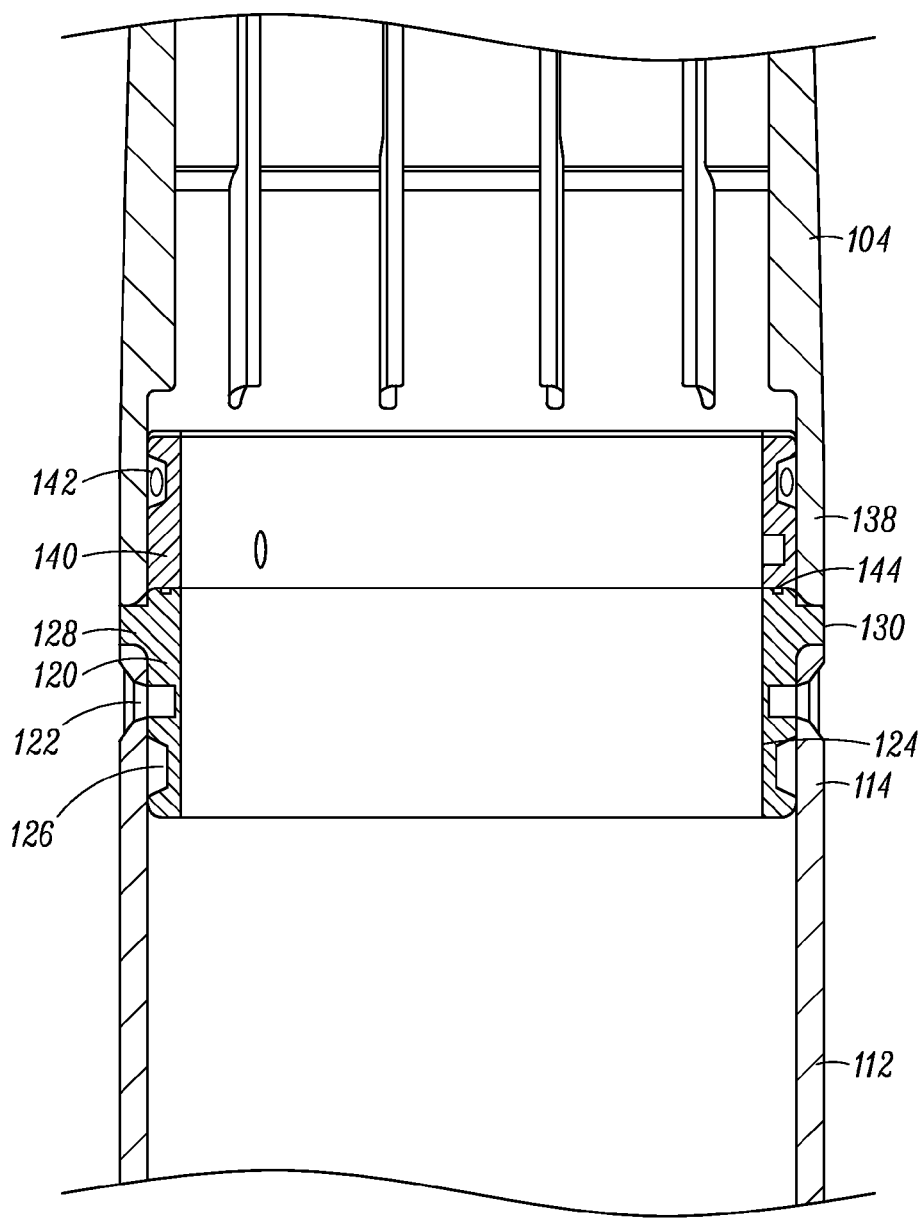
FIG. 5 is a close-up, detailed side cross-sectional view of the joint between the nose cone and the body of the housing in FIG. 4.

FIG. 5 shows an example of a connection or joint between the nose cone 104 and the upper end 114 of the body 112. The upper end 114 of the body 112 includes a cylindrical, ring-shaped bulkhead 120 that are attached together using a plurality of fasteners 122 such as screws, bolts, rivets or the like. The bulkhead 120 includes a lower portion 124 having an outer diameter slightly smaller than the inner diameter of the body 112 so that the lower portion 124 fits within the upper end 114 of the body 112. An elastomeric seal 126 is provided between the lower portion 124 and the body 112 to prevent fluid leakage between the bulkhead 120 and the body 112. The bulkhead 120 also includes an upper portion 128 with a flange 130 having a diameter greater than the lower portion 124 so that the flange 130 rests on the end of the body 112.

A lower end 138 of the nose cone 104 includes a cylindrical, ring-shaped bulkhead 140 that are attached together using a plurality of fasteners such as screws, bolts, rivets or the like. The outer diameter of the bulkhead 140 is slightly smaller than inner diameter of the nose cone 104 so that the bulkhead 140 fits within the lower end 138 of the nose cone 104. An elastomeric seal 142 is provided between the bulkhead 140 and the nose cone 104 to prevent fluid leakage between the bulkhead 140 and the nose cone 104. In addition, an elastomeric seal 144 is provided to seal between mating surfaces of the bulkheads 120, 140.

As discussed further below with respect to FIG. 6, the two bulkheads 120, 140 and thus the nose cone 104 and the body 112 are held together by one or more burn wires 148 that extend parallel to the antenna 26. When the burn wire(s) is broken by directing electrical energy through the wire, the nose cone 104 can be released from the body 112 to permit the balloon(s) to be released. The seals 126, 142, 144 seal the nose cone 104 and the body 112 prior to release of the nose cone 104 to prevent ingress of water into the device 100.

Figure 6:
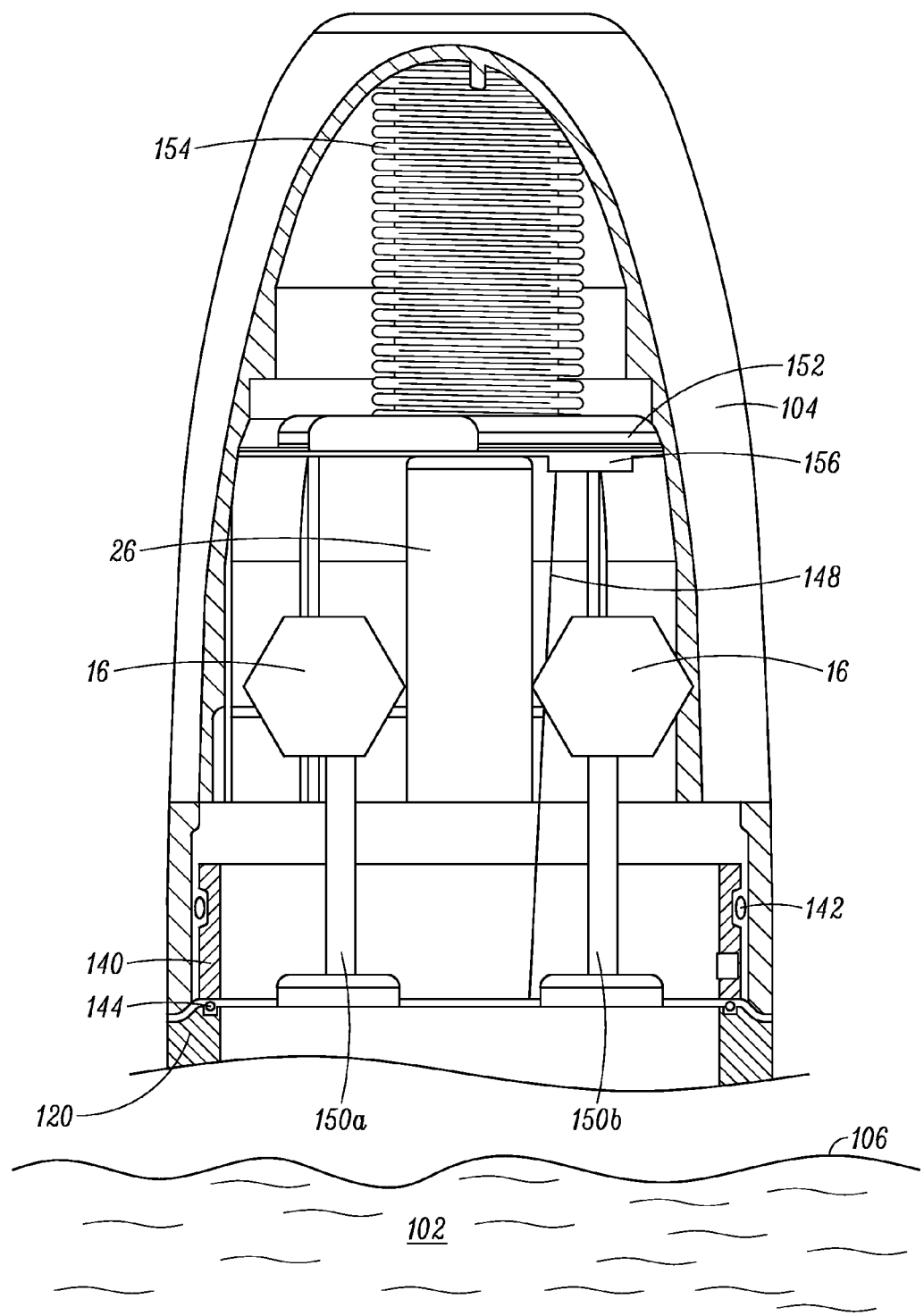
FIG. 6 is a detailed side cross-sectional view of the nose cone showing components within the nose cone.

Turning to FIG. 6, details of the components at the connection or joint between the nose cone 104 and the body 112 are illustrated. In his example, the gas cylinder(s) is disposed in the body 112, and a pair of gas nozzles 150*a*, 150*b* extend upwardly from the gas cylinder(s) and into the nose cone 104. Deflated balloons 16 are attached directly to the nozzles 150*a*, 150*b* rather than using tubing as in FIG. 3. A GPS/satellite antenna 26 also extends upwardly from the body 112 into the nose cone 104.

In this embodiment, the balloon release mechanism includes a mechanism for detaching the nose cone 104 from the body 112, as well as a mechanism for releasing the balloons 16 from the nozzles 150*a*, 150*b*. The mechanism for releasing the nose cone 104 includes the burn wire(s) 148 between the two bulkheads 120, 140 that hold the nose cone 104 to the body 112. The nose cone release mechanism also includes a mechanical mechanism for separating the nose cone 104 from the body 112. The mechanical mechanism includes a horizontal disk 152 that is disposed within the nose cone 104 above the end of the antenna 26. The disk 152 holds back a compressed spring 154 keeping the spring 154 in its compressed state. The spring 154 is fastened at one end to the top of the nose cone 104, and there is a boss on the disk 152 that snaps into the spring 154 at the other end to lightly fasten the disk 152, the spring 154 and the nose cone 104 together.

The disk 152 is held in place to keep the spring 154 in its compressed state by a horizontal burn wire 156. In addition, the burn wire 148 that holds the nose cone 104 and the body 112 together extends from the burn wire 156 to the bulkhead 120 of the body 112. When electricity is directed through the burn wire 148, the burn wire 148 breaks which permits the nose cone 104 to be detached from the body 112. At the same time, when electricity is directed through the burn wire 156, the disk 152 is released which permits the spring 154 to push the disk 152 down into engagement with the antenna 26. Since the antenna 26 is fixed to the body 112, and the nose cone 104 is now released from the body 112, the energy in the spring 154 pushing the disk 152 against the antenna 26 causes the nose cone 104 to separate from the body 112.

Figure 7:
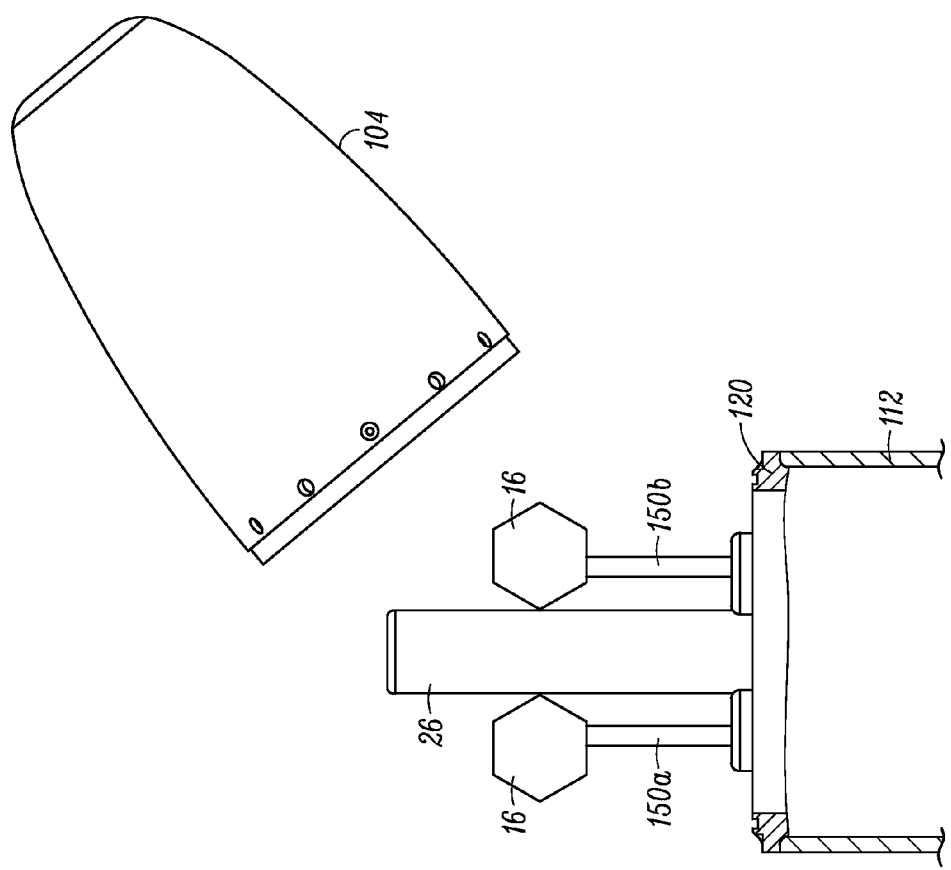
FIG. 7 is a view of the nose cone released from the body of the housing.

FIG. 7 shows the nose cone 104 ejected from the body 112, thereby permitting inflation and release of the balloons 16. The nose cone 104, the spring 154 and the disk 152 can simply sink to the bottom.

Figure 8:
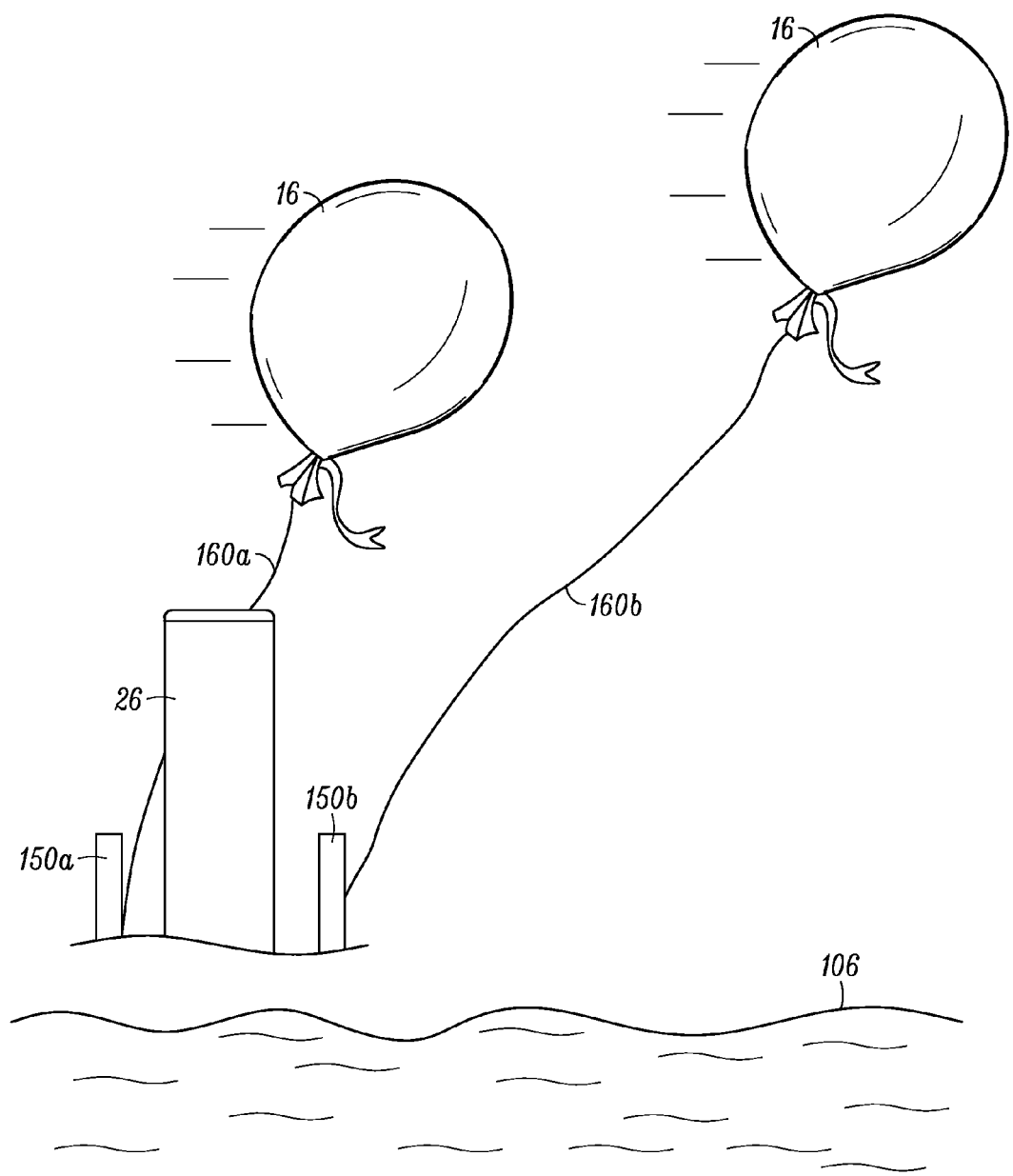
FIG. 8 is a view showing the balloons from FIG. 7 inflated and floating above the surface of the water.

FIG. 8 shows the next stage in operation of the device 100 where the balloons 16 have been inflated and released from the nozzles 150*a*, 150*b* so that the balloons float above the surface 106 of the water. Tethers 160*a*, 160*b* connect the balloons 16 to the device 100, for example to the bulkhead 120 or other portion of the body 112, to prevent the balloons from floating away. In this example, the tether 160*a* is shorter than the tether 160*b* so that the balloon 16 that is connected to the tether 160*a* floats at a vertical height above the water and the device 100 that is less than the floating height of the balloon 16 that is connected to the tether 160*b*. In addition, the balloons are horizontally spaced from each other which helps to enhance the expression on other vessels' RADAR screens.

Figure 9:
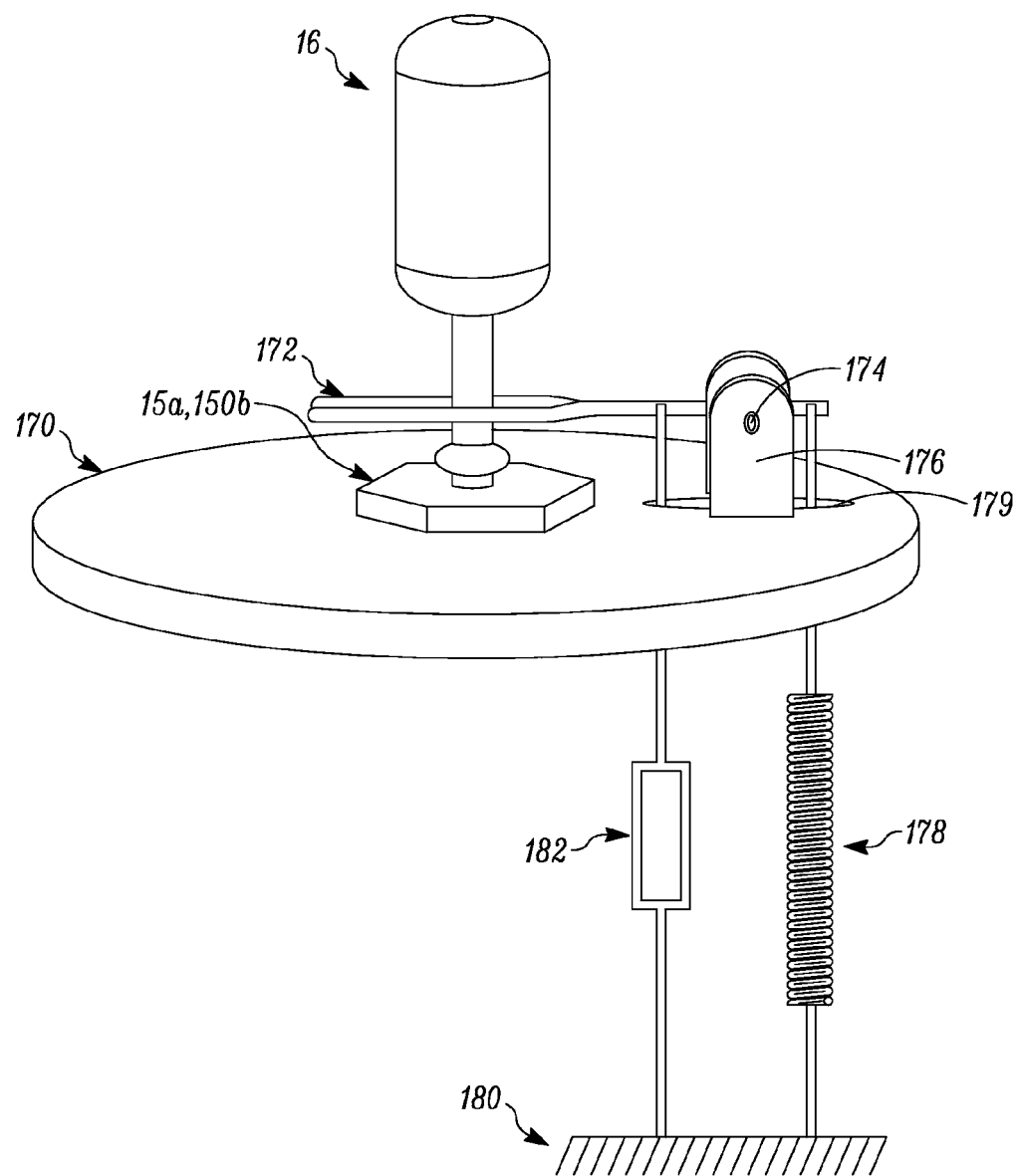
FIG. 9 illustrates an example of an actuatable balloon release mechanism that can be used to release the balloons of FIGS. 6-7 once the balloons are inflated.
Figure 10:
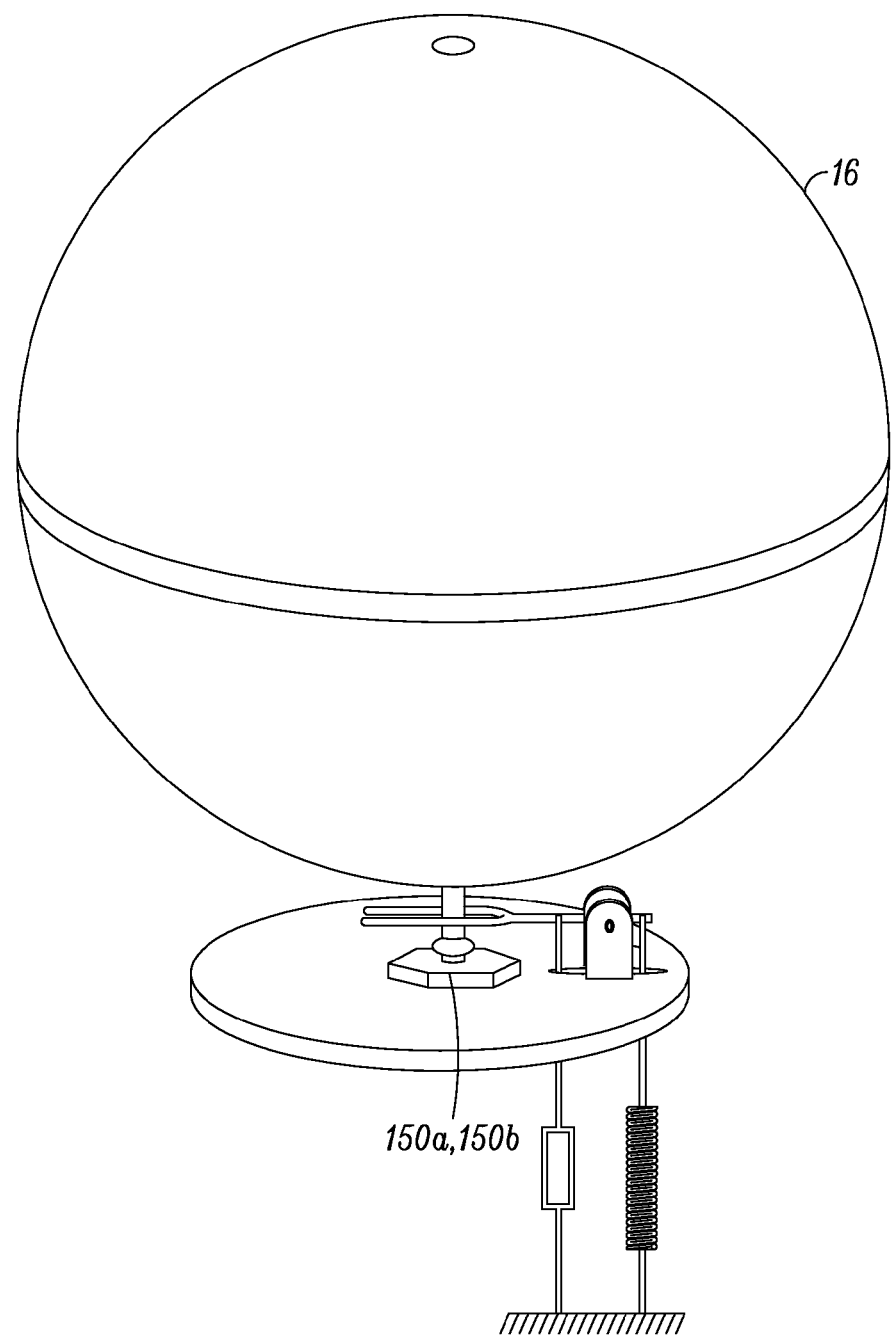
FIG. 10 shows the balloon in FIG. 9 being inflated prior to release.
Figure 11:
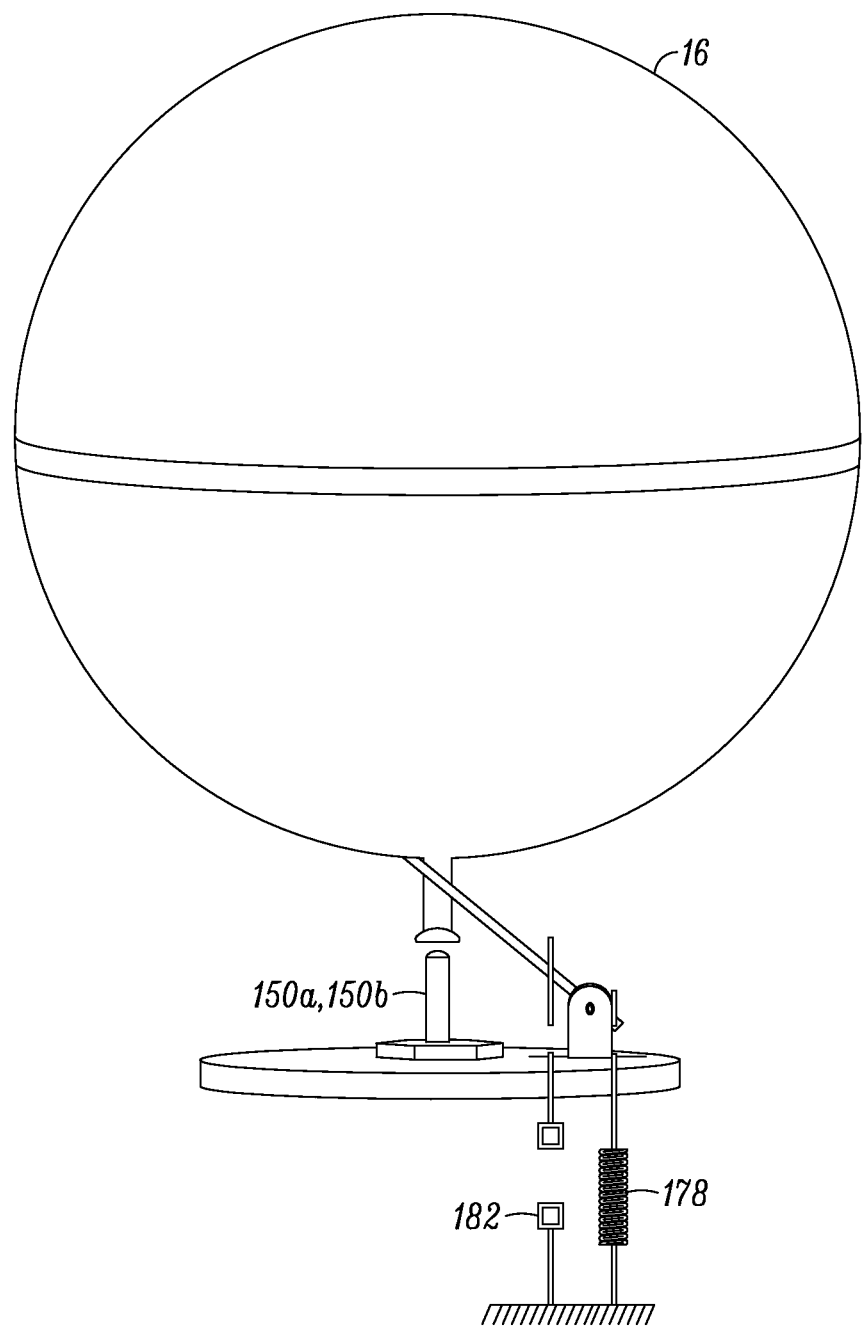
FIG. 11 shows the balloon of FIG. 10 being released by the actuatable balloon release mechanism.

FIGS. 9-11 illustrate one example of how the balloons 16 can be released from the nozzles 150*a*, 150*b* once the balloons are inflated. FIG. 9 shows one of the nozzles 150*a*, 150*b* fixed to and extending upward from a disk 170 that is fixed to the bulkhead 120 of the body 112. The balloon 16 has a self-sealing neck that is pre-installed on the nozzle 150*a*, 150*b* with adhesive material between the nozzle and the neck of the balloon 16 to seal the balloon and prevent leakage upon release from the nozzle. A fork 172 with two prongs at one end is disposed with the nozzle 150*a*, 150*b* and the sleeve of the balloon 16 between the two prongs. The inside sections of the prongs of the fork 172 can be lined with rubber or other friction material to hold a light compression force on the balloon neck to the nozzle. The opposite end of the fork 172 is pivotally attached by a pivot pin 174 to a pivot mount 176.

An extension spring 178 is connected at one end thereof to the end of the fork 172 on one side of the pivot pin 174. The spring 178 extends through a slot 179 formed in the disk 170. The opposite end of the spring 178 is attached to a suitable fixed structure 180 such as the bulkhead 120 or the base 112. In addition, a burn wire 182 extends through the slot 179 and is fixed at one end of the wire 182 to the fork 172 on the side of the pivot pin 174 opposite the point of connection of the spring 178. The opposite end of the burn wire 182 is fixed to the structure 180. The burn wire 182 holds the fork 172 down, keeping the spring in its extended position.

FIG. 10 shows the balloon 16 filled with lifting gas prior to release from the nozzle 150*a*, 150*b*.

With reference to FIG. 11, when the balloon 16 is completely filled, electricity is directed through the burn wire 182 causing it to break. When the burn wire 182 breaks, the spring 178 contracts which rotates the fork 172 upward and pushes the neck of the balloon 16 off of the nozzle 150*a*, 150*b*. The adhesive in the neck of the balloon seals the neck of the balloon 16 to prevent escape of the lifting gas from the balloon 16.

The device 100 in FIGS. 4-11 can be activated in a number of different ways. The device 100 can be activated upon receipt by the transceiver of an external trigger signal. In another embodiment, a wet switch can be provided on the nose cone 104 that senses when the device 100 is floating at the surface of the water with the nose cone above the water surface. The wet switch senses the lack of water on the nose cone 104 which indicates that the nose cone 104 is above the water surface and in position to be activated.

A method includes providing a signal device having a liquid tight, buoyant housing that can be actuated from a closed storage configuration to an open release configuration. A gas cylinder can be disposed within the housing that is charged with a lifting gas. At least two inflatable balloons are provided within the housing, where the balloons are fluidly connectable to the gas cylinder to permit inflation of the balloons by the lifting gas. The balloons are tethered to the housing, and the balloons are made of a metallized plastic film that is RADAR-reflecting. The device can also include an actuatable gas release mechanism that can be actuated to release the lifting gas from the gas cylinder into the balloons in order to inflate the balloons, and an actuatable balloon release mechanism that can actuate the housing from the closed storage configuration to the open release configuration to permit release of the balloons from the housing so that when the balloons are inflated, the balloons float upwardly above the housing while remaining tethered to the housing. In one embodiment, the balloons are tethered to the housing in a manner so that when the balloons are inflated, one of the balloons floats at a first height while a second balloon floats at a second height greater than the first height.

In the examples described herein, the outer surfaces of the balloons are coated with a hydrophobic material so that water from rainfall sheds from the balloons and helps prevent the rainfall from knocking the balloons down during a rainstorm.

In the examples described herein, the balloons can remain floating above the water as long as the balloons retain sufficient lifting gas. The devices can be left in place with the balloons floating in the air until such time that the balloons loose sufficient lifting gas. Or the balloons can be broken or popped if they are no longer needed. In one embodiment, an automated mechanism is provided that causes deflation of the balloons. The devices 10, 100 themselves can be discarded after use, for example thrown away or if they are deployed in the water, allowed to ultimately sink to the bottom.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A RADAR signal device, comprising:
   a housing defining a liquid tight interior space;
   at least one gas cylinder disposed within the interior space, the gas cylinder is charged with a lifting gas;
   at least one inflatable balloon mounted on the housing, the balloon is fluidly connectable to the gas cylinder to permit inflation of the balloon by the lifting gas, the balloon is tethered to the housing, and the balloon includes RADAR-reflecting material;
   an actuatable gas release mechanism that provides controlled release of the lifting gas from the gas cylinder into the balloon in order to inflate the balloon;
   a balloon release mechanism that provides release of the balloon from the housing so that when the balloon is inflated, the balloon floats upwardly above the housing while remaining tethered to the housing; and
   a communication antenna capable of receiving a trigger signal, wherein the RADAR signal device is activated based on the trigger signal.

2. The RADAR signal device of claim 1, wherein the lifting gas is helium;
   the balloon is disposed within the interior space of the housing; and the balloon is made of a metallized plastic film that forms the RADAR-reflecting material.

3. The RADAR signal device of claim 1, comprising at least two of the inflatable balloons, and the balloons are tethered to the housing in a manner so that when the balloons are inflated one of the balloons floats at a first height while a second balloon floats at a second height greater than the first height.

4. The RADAR signal device of claim 3, wherein the balloon that floats at the first height is tethered to the housing by a first tether, the balloon that floats at the second height is tethered to the housing by a second tether, and a first point where the first tether is attached to the housing is horizontally spaced from a second point where the second tether is attached to the housing.

5. The RADAR signal device of claim 1, further comprising at least one battery disposed in the housing, and wherein the communication antenna is electrically connected to the battery.

6. The RADAR signal device of claim 1 further comprising a GPS antenna and/or a satellite antenna.

7. The RADAR signal device of claim 1, wherein the communication antenna is part of a communications transceiver in the housing that permits the RADAR signal device to send and receive communications.

8. The RADAR signal device of claim 1, wherein the housing is configured for use within water and the housing is buoyant.

9. The RADAR signal device of claim 1, wherein the housing is cylindrical and includes a nose cone that is removably attached to a main body; and the housing is buoyant such that when the housing is disposed in water, the nose cone is disposed above a surface of the water.

10. The RADAR signal device of claim 1, wherein the housing includes at least one frangible joint that can be broken to permit release of the balloon.

11. A RADAR signal device, comprising:
    a liquid tight, buoyant housing that can be actuated from a closed storage configuration to an open release configuration;
    a gas cylinder disposed within the housing, the gas cylinder is charged with a lifting gas;
    at least two inflatable balloons within the housing, the balloons are fluidly connectable to the gas cylinder to permit inflation of the balloons by the lifting gas, the balloons are tethered to the housing, and the balloons are made of a metallized plastic film that is RADAR-reflecting;
    an actuatable gas release mechanism that when actuated releases the lifting gas from the gas cylinder into the balloons in order to inflate the balloons;
    an actuatable balloon release mechanism that can actuate the housing from the closed storage configuration to the open release configuration to permit release of the balloons from the housing so that when the balloons are inflated, the balloons float upwardly above the housing while remaining tethered to the housing;
    the balloons are tethered to the housing in a manner so that when the balloons are inflated one of the balloons floats at a first height while a second balloon floats at a second height greater than the first height; and
    a communication antenna capable of receiving a trigger signal, wherein the RADAR signal device is activated based on the trigger signal.

12. The RADAR signal device of claim 11, further comprising at least one battery disposed in the housing, and wherein the communication antenna is electrically connected to the battery.

13. The RADAR signal device of claim 11, further comprising a GPS antenna and/or a satellite antenna.

14. The RADAR signal device of claim 11, wherein the communication antenna is part of a communications transceiver in the housing that permits the RADAR signal device to send and receive communications.

15. The RADAR signal device of claim 11, wherein the balloon that floats at the first height is tethered to the housing by a first tether, the balloon that floats at the second height is tethered to the housing by a second tether, and a first point where the first tether is attached to the housing is horizontally spaced from a second point where the second tether is attached to the housing.

* * * * *